(12) United States Patent  (10) Patent No.: US 11,669,706 B2
Maehira  (45) Date of Patent: Jun. 6, 2023

(54) PRINTER, COMPUTER-READABLE MEDIUM, AND METHOD TO SELECTIVELY PRINT AT LEAST ONE PATCH IMAGE FROM AMONG PATCH IMAGES OF LAYERS

(71) Applicant: Brother Kogyo Kabushiki Kaisha, Nagoya (JP)

(72) Inventor: Hirotoshi Maehira, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/805,067

(22) Filed: Jun. 2, 2022

(65) Prior Publication Data

US 2022/0398420 A1 Dec. 15, 2022

(30) Foreign Application Priority Data

Jun. 9, 2021 (JP) .............................. JP2021-096420

(51) Int. Cl.
*G06K 15/02* (2006.01)
*G06K 15/10* (2006.01)

(52) U.S. Cl.
CPC ....... *G06K 15/1861* (2013.01); *G06K 15/102* (2013.01)

(58) Field of Classification Search
None
See application file for complete search history.

(56) References Cited

U.S. PATENT DOCUMENTS

| 8,018,622 | B2 * | 9/2011 | Ono | H04N 1/00838 |
| | | | | 358/2.1 |
| 2005/0058476 | A1 * | 3/2005 | Murakami | H04N 1/00883 |
| | | | | 399/366 |
| 2007/0081841 | A1 * | 4/2007 | Nakano | H04N 1/00074 |
| | | | | 400/62 |
| 2012/0212754 | A1 | 8/2012 | Hirata et al. | |
| 2016/0014296 | A1 * | 1/2016 | Saka | H04N 1/40062 |
| | | | | 358/3.24 |
| 2020/0081673 | A1 | 3/2020 | Hayashi | |

FOREIGN PATENT DOCUMENTS

| JP | 2010-157920 A | 7/2010 |
| JP | 2012-171139 A | 9/2012 |
| JP | 2013-215888 A | 10/2013 |
| JP | 2015-062281 A | 4/2015 |
| JP | 2020-042543 A | 3/2020 |

* cited by examiner

*Primary Examiner* — Miya J Williams
(74) *Attorney, Agent, or Firm* — Burr Patent Law, PLLC (57) ABSTRACT

A printer includes a print head and a controller. The controller is configured to, using first print data containing a plurality of layers, select at least one, but not all, of the plurality of layers based on weight information regarding respective weights of the plurality of layers, generate second print data based on the selected at least one but not all of the plurality of layers, and control the print head to print at least one patch image on a printing medium based on the generated second print data.

9 Claims, 10 Drawing Sheets

| LAYER | WEIGHT VALUE |
|---|---|
| CHARACTER LAYER | WD1 |
| BACKGROUND LAYER | WD2 |
| ON-PIXEL IMAGE DATA OF IMAGE LAYER | WD3 |
| OFF-PIXEL IMAGE DATA OF IMAGE LAYER | WD4 |

PRINTER, COMPUTER-READABLE MEDIUM, AND METHOD TO SELECTIVELY PRINT AT LEAST ONE PATCH IMAGE FROM AMONG PATCH IMAGES OF LAYERS

CROSS REFERENCE TO RELATED APPLICATIONS

This application claims priority under 35 U.S.C. § 119 from Japanese Patent Application No. 2021-096420 filed on Jun. 9, 2021. The entire subject matter of the application is incorporated herein by reference.

BACKGROUND

Heretofore, printers to perform printing using print data containing a plurality of layers have been known. For instance, a printer has been disclosed that is configured to print, on a printing medium, a white ink patch image of an underlayer and a color patch image of an upper layer above the white ink patch image.

SUMMARY

However, in the known printer as above, it is difficult to reduce a memory capacity thereof. This is because the known printer prints, on the printing medium, both the white ink patch image represented by the underlayer and the color patch image represented by the upper layer positioned above the underlayer.

Aspects of the present disclosure are advantageous to provide one or more improved techniques that make it possible for a printer to selectively print at least one patch image from among patch images of a plurality of layers and reduce a memory capacity of the printer.

According to aspects of the present disclosure, a printer is provided, which includes a print head and a controller. The controller is configured to, using first print data containing a plurality of layers, select at least one, but not all, of the plurality of layers based on weight information regarding respective weights of the plurality of layers. The controller is further configured to generate second print data based on the selected at least one but not all of the plurality of layers. The controller is further configured to control the print head to print at least one patch image on a printing medium based on the generated second print data.

According to aspects of the present disclosure, further provided is a non-transitory computer-readable medium storing computer-readable instructions executable by a controller of a printer. The printer includes a print head. The instructions are configured to, when executed by the controller, cause the controller to, using first print data containing a plurality of layers, select at least one, but not all, of the plurality of layers based on weight information regarding respective weights of the plurality of layers. The instructions are further configured to, when executed by the controller, cause the controller to generate second print data based on the selected at least one but not all of the plurality of layers. The instructions are further configured to, when executed by the controller, cause the controller to control the print head to print at least one patch image on a printing medium based on the generated second print data.

According to aspects of the present disclosure, further provided is a method implementable on a controller of a printer. The printer includes a print head. The method includes, by using first print data containing a plurality of layers, selecting at least one, but not all, of the plurality of layers based on weight information regarding respective weights of the plurality of layers. The method further includes generating second print data based on the selected at least one but not all of the plurality of layers. The method further includes controlling the print head to print at least one patch image on a printing medium based on the generated second print data.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

An illustrative embodiment according to aspects of the present disclosure will be described with reference to the accompanying drawings.

Figure 1:
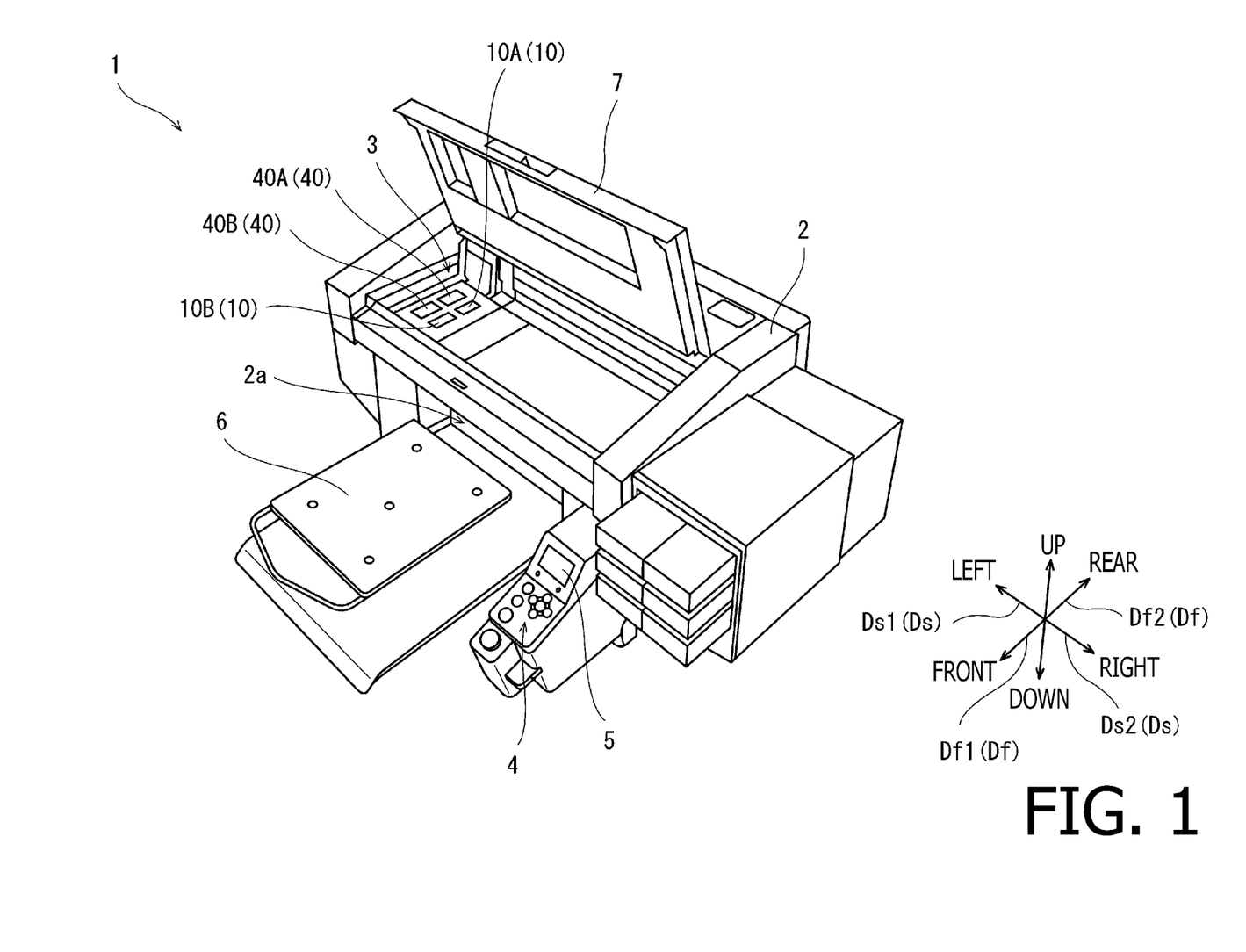
FIG. 1 is a perspective view showing a printer.

FIG. 1 is a perspective view showing a printer 1 in the illustrative embodiment according to aspects of the present disclosure. FIG. 1 shows an example of the printer 1 configured as an inkjet printer. However, the printer 1 is not limited to an inkjet printer, but may be other types of printers such as a laser printer. As shown in FIG. 1, mutually orthogonal directions will be defined as a vertical direction (i.e., an up-down direction), a left-right direction, and a front-rear direction. In this case, the left-right direction is a main scanning direction Ds. The front-rear direction is a sub scanning direction Df. In the main scanning direction Ds, when the printer 1 is viewed from the front (see FIG. 1), a direction toward the left is a leftward direction Ds1, and a direction toward the right is a rightward direction Ds2. In the sub scanning direction Df, a direction toward an after-described platen 6 is a frontward direction Df1. In addition, the opposite direction of the frontward direction Df1 is a rearward direction Df2. The printer 1 is configured to perform printing on printing media W such as printing paper, woven fabric, and a plastic case (e.g., a smartphone case).

As shown in FIG. 1, the printer 1 includes a housing 2, operable keys 4, a display device 5, a platen on which the printing medium W placed 6, and a top cover 7. Further, the printer 1 includes a liquid ejector 1*a* (see FIG. 2) and a controller unit 19 (see FIG. 5), which will be described below.

The housing 2 is formed in a box shape. The housing 2 has an opening 2*a* in a front face, and an opening (not shown) in a rear face. The operable keys 4 are disposed at a front right side of the housing 2. The operable keys 4 include a weight value setting section 4*a* and an image selection setting section 4*b*. The weight value setting section 4*a* and the image selection setting section 4*b* will be described in detail later. The display device 5 is disposed rear of the operable keys 4. Each operable key 4 is configured to accept input of a user operation. For instance, the display device 5 includes a touch panel, and is configured to show particular types of information. A part of the display device 5 serves as operable keys at particular timing. The controller unit 19 is configured to achieve a printing function and control the display device 5, based on external inputs via the operable keys 4 or a communication interface (not shown).

The platen 6 is configured to support the printing medium W placed thereon. The platen 6 has a particular thickness. For instance, the platen 6 is formed with a rectangular plate material having the sub scanning direction Df as a longitudinal direction. The platen 6 is removably supported by a platen support stand (not shown). The platen support stand is configured to be driven by a transfer motor 33 (see FIG. 5) and move along the sub scanning direction Df between a printing position and a medium-removable position. Thereby, the platen 6 moves a liquid-ejected surface of the printing medium W relative to after-mentioned liquid-ejecting heads 10, along the sub scanning direction Df. The printing position is a position where the platen 6 faces the liquid-ejecting heads 10, and printing is executable on the printing medium W placed on the platen 6. The medium-removable position is a position where the platen support stand is placed outside the housing 2, and the printing medium W is placeable on and removable from the platen 6. To perform printing, the platen 6 is moved in the sub scanning direction Df Therefore, in this case, the printing medium W placed on the platen 6 is transported in the sub-scanning direction Df.

The top cover 7 is configured to rotate upward when its front portion is lifted. Thereby, the inside of the housing 2 to be exposed.

Figure 2:
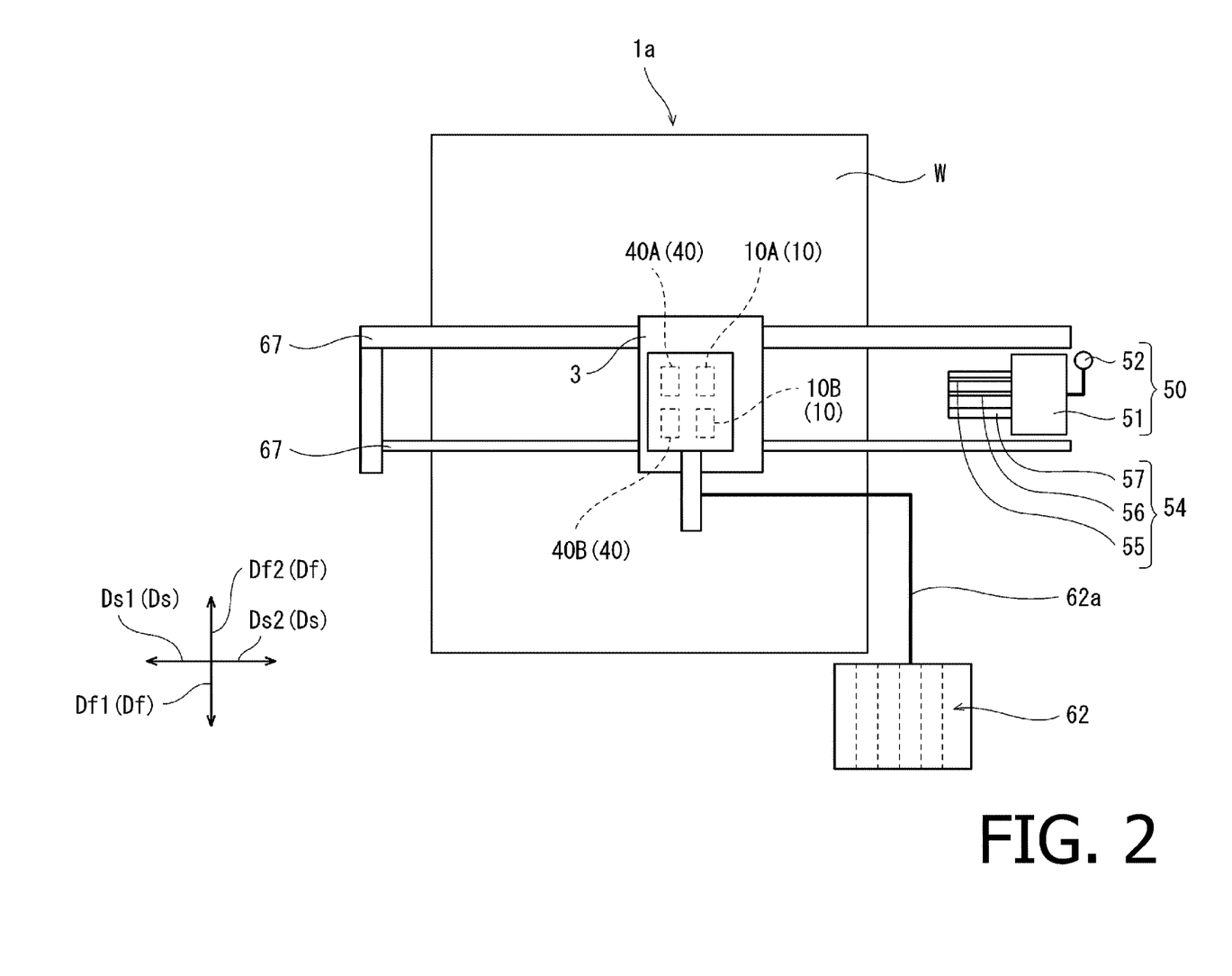
FIG. 2 is a plan view showing an example of a liquid ejector of the printer.

As shown in FIG. 2, the liquid ejector 1*a* includes storage tanks 62, a carriage 3 on which two liquid-ejecting heads 10 (10A, 10B) and two UV ("UV" is an abbreviation for "ultraviolet") irradiators 40 (40A, 40B) are mounted, and two guiderails 67. As the liquid-ejecting heads 10, serial inkjet heads may be employed that is configured to eject, for instance, UV-curable ink as liquid. Each UV irradiator 40 has a plurality of LED ("LED" is an abbreviation for "Light Emitting Diode") chips to emit UV light. Namely, the UV irradiators 40 are configured to irradiate, with UV light, ink ejected by the liquid-ejecting heads 10, thereby curing the ink. FIG. 2 shows an example in which the liquid ejector 1*a* includes the two liquid-ejecting heads 10 (10A, 10B) and the two UV irradiators 40 (40A, 40B). However, the liquid ejector 1*a* is not limited to the configuration shown in FIG. 2. For instance, the liquid ejector 1*a* may include one liquid-ejecting head 10 and one UV irradiator 40. In another instance, the liquid ejector 1*a* may include three or more liquid-ejecting heads 10 and three or more UV irradiators 40. When the UV-curable ink is not employed as the liquid, the UV irradiators 40 are unnecessary.

The carriage 3 is supported by the two guiderails 67 extending in the main scanning direction Ds. The carriage 3 is guided by the guiderails 67, to reciprocate along the main scanning direction Ds. Thereby, the two liquid-ejecting heads 10 (10A, 10 B) and the two UV irradiators 40 (40A, 40 B) are enabled to reciprocate along the main scanning direction Ds. The liquid-ejecting heads 10 are connected with the storage tanks 62 via a tube 62A. Each of the storage tanks 62 is provided to store a corresponding type of ink. For instance, six storage tanks 62 are provided, each of which stores a corresponding one of ink of six colors such as black, yellow, cyan, magenta, white, and clear.

Figure 3:
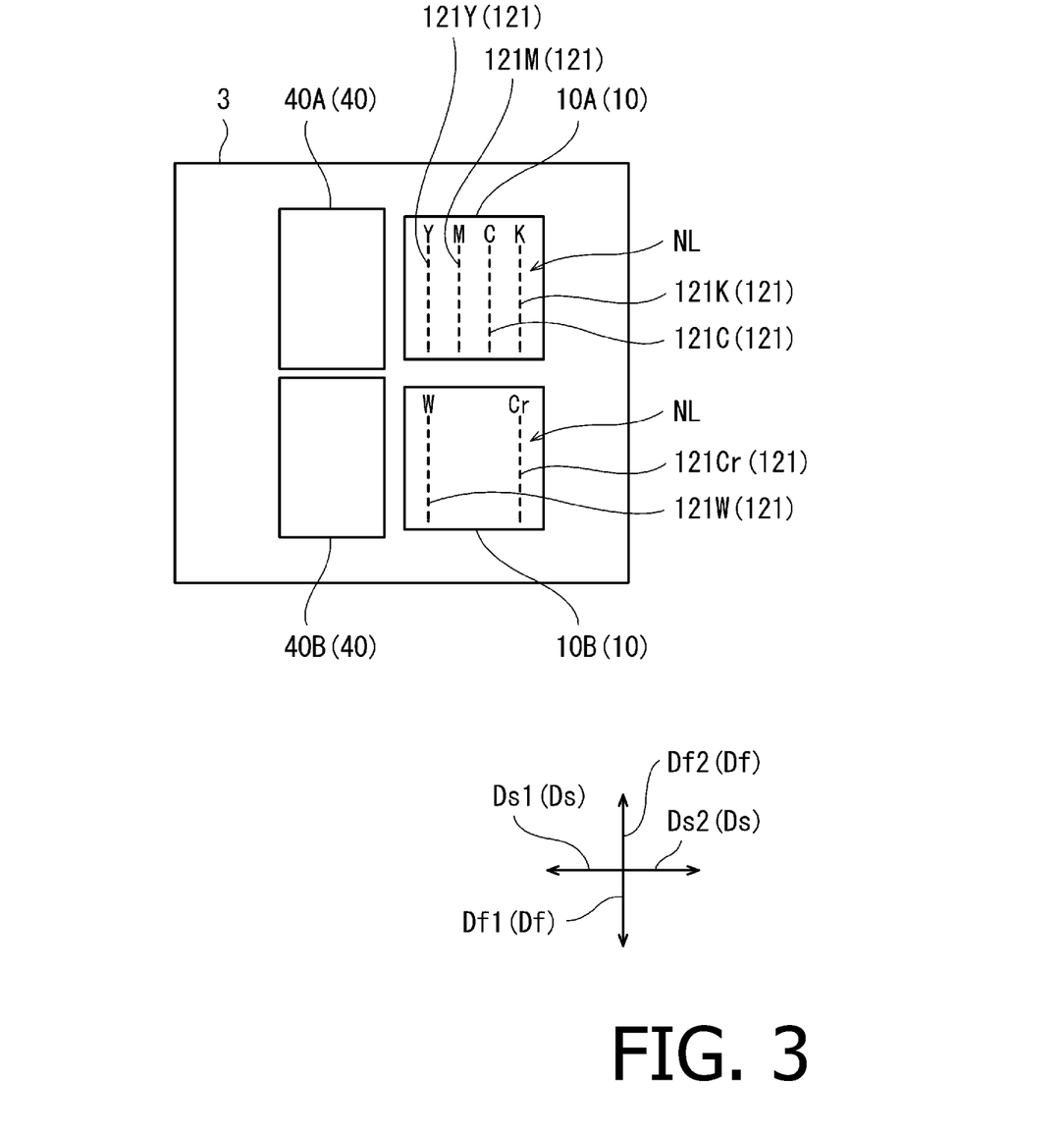
FIG. 3 is a plan view showing liquid-ejecting heads and UV irradiators included in the liquid ejector.

As shown in FIG. 3, the liquid-ejecting heads 10A and 10B are arranged side by side along the sub scanning direction Df. The liquid-ejecting head 10B is disposed in front of the liquid-ejecting head 10A. The UV irradiators 40A and 40B are arranged side by side along the sub scanning direction Df. The UV irradiator 40B is disposed in front of the UV irradiator 40A. The liquid-ejecting head 10A and the UV irradiator 40A are arranged side by side along the main scanning direction Ds. The UV irradiator 40A is disposed left of the liquid-ejecting head 10A. The liquid-ejecting head 10B and the UV irradiator 40B are arranged side by side along the main scanning direction Ds. The UV irradiator 40B is disposed left of the liquid-ejecting head 10B. It is noted that the liquid-ejecting head 10A and the UV irradiator 40A may be disposed on the opposite sides to their positions shown in FIG. 2 in the main scanning direction Ds. Moreover, the liquid-ejecting head 10B and the UV irradiator 40B may be disposed on the opposite sides to their positions shown in FIG. 2 in the main scanning direction Ds.

In the illustrative embodiment, the carriage 3 moves in the rightward direction Ds2 during each single pass of a printing process. Thereby, in the printing process, the liquid-ejecting heads 10 and the UV irradiators 40 move in the rightward direction Ds2. In this case, the liquid-ejecting heads 10 eject ink onto the printing medium W while moving in the rightward direction Ds2 along the main scanning direction Ds. In addition, the UV irradiators 40 irradiate, with UV light, the ink landed on the printing medium W while moving in the rightward direction Ds2 along the main scanning direction Ds. Thus, the UV irradiators 40 are positioned upstream of the liquid-ejecting heads 10 in the moving direction of the carriage 3 in the printing process. Accordingly, it is possible to irradiate, with the UV light, the ink just landed on the printing medium W.

After completion of a single pass in the printing process, the carriage 3 moves in the leftward direction Ds1 and returns to a predetermined position. Thereby, the liquid-ejecting heads 10 and the UV irradiators 40 move in the leftward direction Ds1. In this case, the liquid-ejecting heads 10 move in the leftward direction Ds1 without ejecting ink. The UV irradiators 40 irradiate, with UV light, the ink ejected in the printing process while moving in the leftward direction Ds1. Accordingly, it is possible to irradiate the ink with a sufficient quantity of UV light, thereby further curing the ink.

In the illustrative embodiment, for instance, the liquid-ejecting head 10A is configured to eject yellow (Y) ink, magenta (M) ink, cyan (C) ink, and black (K) ink, which may be collectively referred to as "colored inks." The liquid-ejecting head 10A has a nozzle array NL including a plurality of yellow ink nozzles 121Y to eject yellow ink, a nozzle array NL including a plurality of magenta ink nozzles 121M to eject magenta ink, a nozzle array NL including a plurality of cyan ink nozzles 121C to eject cyan ink, and a nozzle array NL including a plurality of black ink nozzles 121K to eject black ink. Each nozzle array NL extends along the sub scanning direction Df. The liquid-ejecting head 10A ejects, from the four nozzle arrays NL, the above four colored inks onto the printing medium W, thereby printing a color image on the printing medium W. It is noted that the arrangement order of the four nozzle arrays NL for the four colored inks in the main scanning direction Ds is not limited to the aforementioned order, but may be set arbitrarily.

On the other hand, the liquid-ejecting head 10B is configured to eject white (W) ink and clear (Cr) ink. When printing a color image on, for instance, woven fabric as the printing medium W, to reduce influences on the color and material of the woven fabric, the printer 1 first ejects white ink as base ink, and then ejects colored inks over the white ink. In addition, the printer 1 may eject clear ink to impart gloss or to protect the printed area. The liquid-ejecting head 10B has a nozzle array NL including a plurality of white ink nozzles 121W to eject white ink, and a nozzle array NL including a plurality of clear ink nozzles 121Cr to eject clear ink. Each nozzle array NL extends along the sub scanning direction Df. It is noted that the arrangement order of the two nozzle arrays NL for the white ink and the clear ink in the main scanning direction Ds is not limited to the aforementioned order, but may be set arbitrarily.

As shown in FIG. 2, the liquid ejector 1a further includes a purge device 50 and a wiping device 54. The purge device 50 and the wiping device 54 are disposed at an end portion of the two guiderails 67 in the main scanning direction Ds, in such a manner as to overlap a movable range of the carriage 3.

The purge device 50 includes a cap 51, a suction pump 52, and an elevating mechanism 53. The suction pump 52 is connected with the cap 51. The elevating mechanism 53 is configured to raise and lower the cap 51 between a suction position and a standby position. In the standby position, a nozzle surface NM (see FIG. 4) is separated from the cap 51. Meanwhile, in the suction position, the nozzle surface NM is covered by the cap 51, to form a sealed space. When the suction pump 52 is driven with the cap 51 in the suction position, the sealed space is suctioned, and ink is ejected from each of nozzle holes 121a to be described later (see FIG. 4). Thus, a purging process may be performed to force ink to be ejected from the nozzles 121.

The wiping device 54 includes two wipers 55 and 56 and a moving mechanism 57. The two wipers 55 and 56 are supported by the moving mechanism 57. The moving mechanism 57 moves in the sub scanning direction Df with the nozzle surface NM positioned to face the wipers 55 and 56. Thereby, the two wipers 55 and 56 perform a wiping operation to wipe the nozzle surface NM while moving in the sub scanning direction Df.

Figure 4:
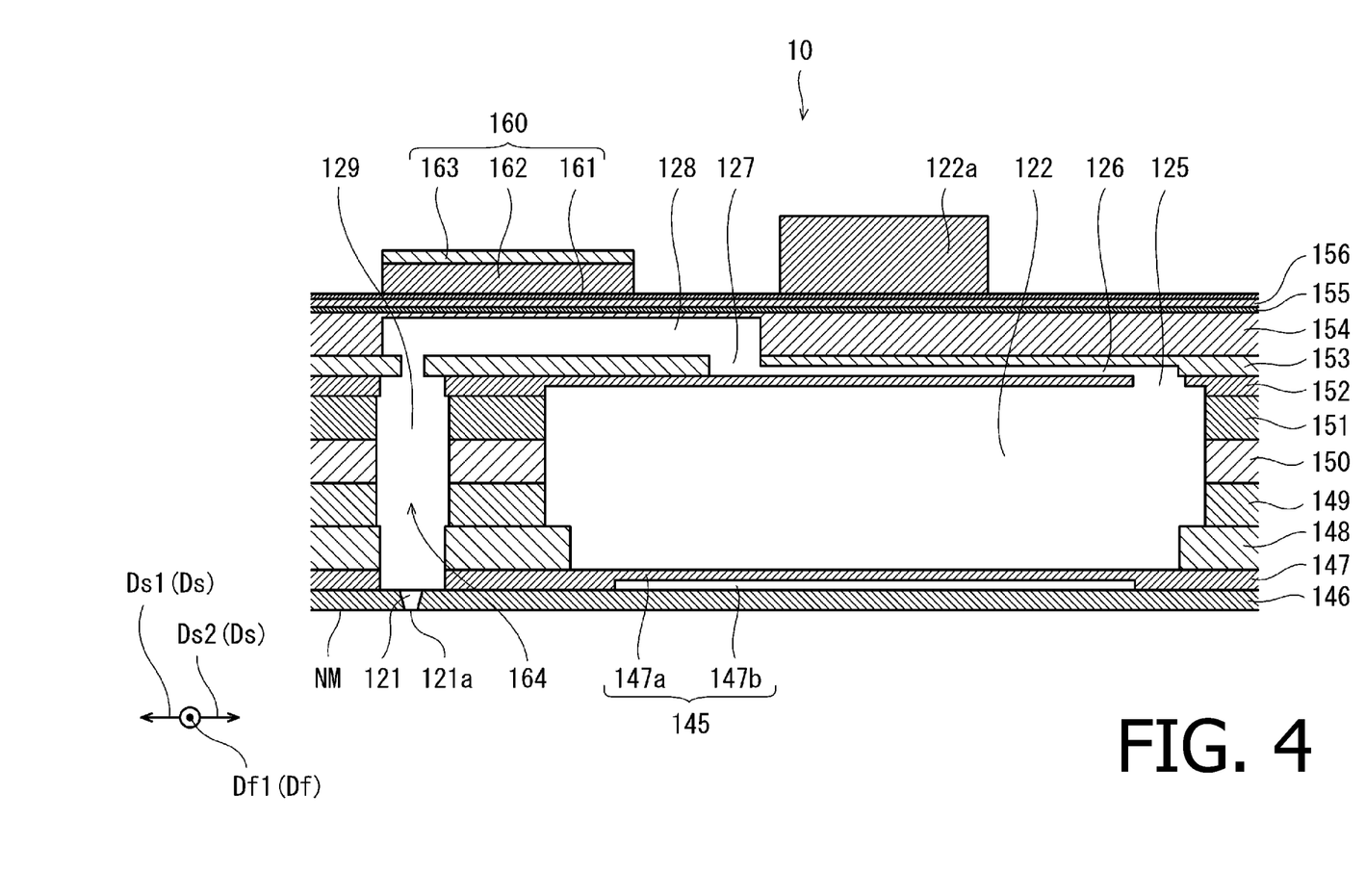
FIG. 4 is a cross-sectional view showing a configuration of each liquid-ejecting head.

Next, a cross-sectional structure of each liquid-ejecting head 10 will be described with reference to the relevant drawings. As shown in FIG. 4, each liquid-ejecting head 10 has a plurality of nozzles 121 configured to eject ink droplets therefrom using the ink stored in the storage tanks 62. Each liquid-ejecting head 10 has a laminate of a flow passage forming body and a volume changing section. The flow passage forming body has ink flow passages formed therein. A plurality of nozzle holes 121a are formed in the nozzle surface NM that is a lower surface of the flow passage forming body. The volume changing section is driven to change the volume of each ink flow passage. At this time, ink is ejected from a corresponding nozzle hole 121a due to vibration of a meniscus. A configuration of each liquid-ejecting head 10 will be described in detail below.

The aforementioned flow passage forming body of each liquid-ejecting head 10 is a laminate of a plurality of plates. The volume changing section includes a diaphragm 155 and an actuator (e.g., a piezoelectric element) 160. On the diaphragm 155, an insulating film 156 is formed and connected with the diaphragm 155. On the insulating film 156, an after-mentioned common electrode 161 is formed and connected with the insulating film 156.

The plurality of plates are laminated, which include, from bottom to top, a nozzle plate 146, a spacer plate 147, a first flow passage plate 148, a second flow passage plate 149, a third flow passage plate 150, a fourth flow passage plate 151, a fifth flow passage plate 152, a sixth flow passage plate 153, and a seventh flow passage plate 154.

Each plate has holes and grooves of various sizes. The holes and the grooves are combined inside the flow passage forming body as a laminate of the plurality of plates. Thereby, a plurality of nozzles 121, a plurality of individual flow passages 164, and a manifold 122 are formed as an ink flow passage.

Each nozzle 121 is formed to penetrate the nozzle plate 146 in a lamination direction (i.e., a direction orthogonal to the main scanning direction Ds and the sub scanning direction Df in FIG. 4). In the nozzle surface NM of the nozzle plate 146, the nozzle arrays NL are formed each of which includes a plurality of nozzle holes 121a (which are liquid-ejecting ends of the nozzles 121) arranged along the sub scanning direction Df.

The manifold 122 supplies ink to a pressure chamber 128 to which an ink ejection pressure is applied. The manifold 122 extends in the sub scanning direction Df. The manifold 122 is connected with an end of each individual flow passage 164. In other words, the manifold 122 serves as a common flow passage for ink. The manifold 122 is formed with through holes each of which penetrates a corresponding one of the first to fourth flow passage plates 148 to 151 and a portion recessed from the lower surface of the fifth flow passage plate 152 being overlaid in the lamination direction.

The nozzle plate 146 is positioned below the spacer plate 147. For instance, the spacer plate 147 is formed of stainless steel. The spacer plate 147 has a recession 145 formed with a damper section 147a as a thin-walled section and a damper space 147b. The recession 145 is formed by the spacer plate 147 being, for instance, half-etched and recessed from a surface facing the nozzle plate 146 in a thickness direction of the spacer plate 147. Thus, the damper space 147b is formed as a buffer space, between the manifold 122 and the nozzle plate 146.

A supply port 122a is communicated with the manifold 122. For instance, the supply port 122a is formed in a cylindrical shape. The supply port 122a is disposed at an end portion in the sub scanning direction Df. The manifold 122 and the supply port 122a are connected with each other via a flow passage (not shown).

Each of the plurality of individual flow passages 164 is connected with the manifold 122. Each individual flow passage 164 has an upstream end connected with manifold 122, and a downstream end connected with a base end of the corresponding nozzle 121. Each individual flow passage 164 includes a first communication hole 125, a supply restriction passage 126 as an individual restriction passage, a second communication hole 127, a pressure chamber 128, and a descender 129. These elements included in each individual flow passage 164 are arranged in the aforementioned order.

The first communication hole 125 has a lower end connected with an upper end of the manifold 122. The first communication hole 125 extends upward from the manifold 122 in the lamination direction. The first communication hole 125 penetrates an upper portion of the fifth flow passage plate 152 in the lamination direction.

The supply restriction passage 126 has an upstream end connected with an upper end of the first communication hole 125. For instance, the supply restriction passage 126 is half-etched and thereby formed with a groove recessed from a lower surface of the sixth flow passage plate 153. The second communication hole 127 has an upstream end connected with a downstream end of the supply restriction passage 126. The second communication hole 127 extends upward from the supply restriction passage 126 in the lamination direction. The second communication hole 127 penetrates the sixth flow passage plate 153 in the lamination direction.

The pressure chamber 128 has an upstream end connected with a downstream end of the second communication hole 127. The pressure chamber 128 is formed to penetrate the seventh flow passage plate 154 in the lamination direction.

The descender 129 is formed to penetrate, in the lamination direction, the spacer plate 147, the first flow passage plate 148, the second flow passage plate 149, the third flow passage plate 150, the fourth flow passage plate 151, the fifth flow passage plate 152, and the sixth flow passage plate 153. The descender 129 has an upstream end connected with a downstream end of the pressure chamber 128, and a downstream end connected with the base end of the corresponding nozzle 121. For instance, the nozzle 121 is disposed in a center of the descender 129 in a width direction (i.e., the left-right direction), to overlap the descender 129 when viewed in the lamination direction.

The diaphragm 155 is overlaid on the seventh flow passage plate 154, to cover an upper end opening of the pressure chamber 128.

Each actuator 160 includes a common electrode 161, a piezoelectric layer 162, and an individual electrode 163, which are arranged in this order upward from the bottom. The common electrode 161 covers the entire surface of the diaphragm 15 via the insulating film 156. The piezoelectric layer 162 is provided for each pressure chamber 128. The piezoelectric layer 162 is disposed on the common electrode 161, to overlap each pressure chamber 128. The individual electrode 163 is provided for each pressure chamber 128. The individual electrode 163 is disposed on the piezoelectric layer 162. Thus, each single actuator 160 is formed with a corresponding single piezoelectric layer 162 sandwiched between a corresponding single individual electrode 163 and the common electrode 161.

Each individual electrode 163 is electrically connected with a driver IC. The driver IC is configured to receive a control signal from an after-mentioned controller 20, generate a drive signal (i.e., a voltage signal), and apply the drive signal to the individual electrodes 163. In contrast, the common electrode 161 is always held at the ground potential. In the configuration as above, an active portion of the piezoelectric layer 162 expands and contracts in a surface direction in response to the drive signal, together with the common electrode 161 and the individual electrode 163. In response to such expansion and contraction, the diaphragm 155 cooperatively deforms in such a direction as to increase or decrease the volume of the pressure chamber 128. Thereby, an ejection pressure to eject ink from the nozzle 121 is applied to the pressure chamber 128.

In each liquid-ejecting head 10 configured as above, ink flows into the manifold 122 through the supply port 122a, then flows from the manifold 122 into the supply restriction passage 126 through the first communication hole 125, and further flows from the supply restriction passage 126 to the pressure chamber 128 through the second communication hole 127. Afterward, the ink flows into the nozzle 121 through the descender 129. Here, when an ejection pressure is applied to the pressure chamber 128 by the actuator 160, the ink is ejected from the corresponding nozzle hole 121a.

Figure 5:
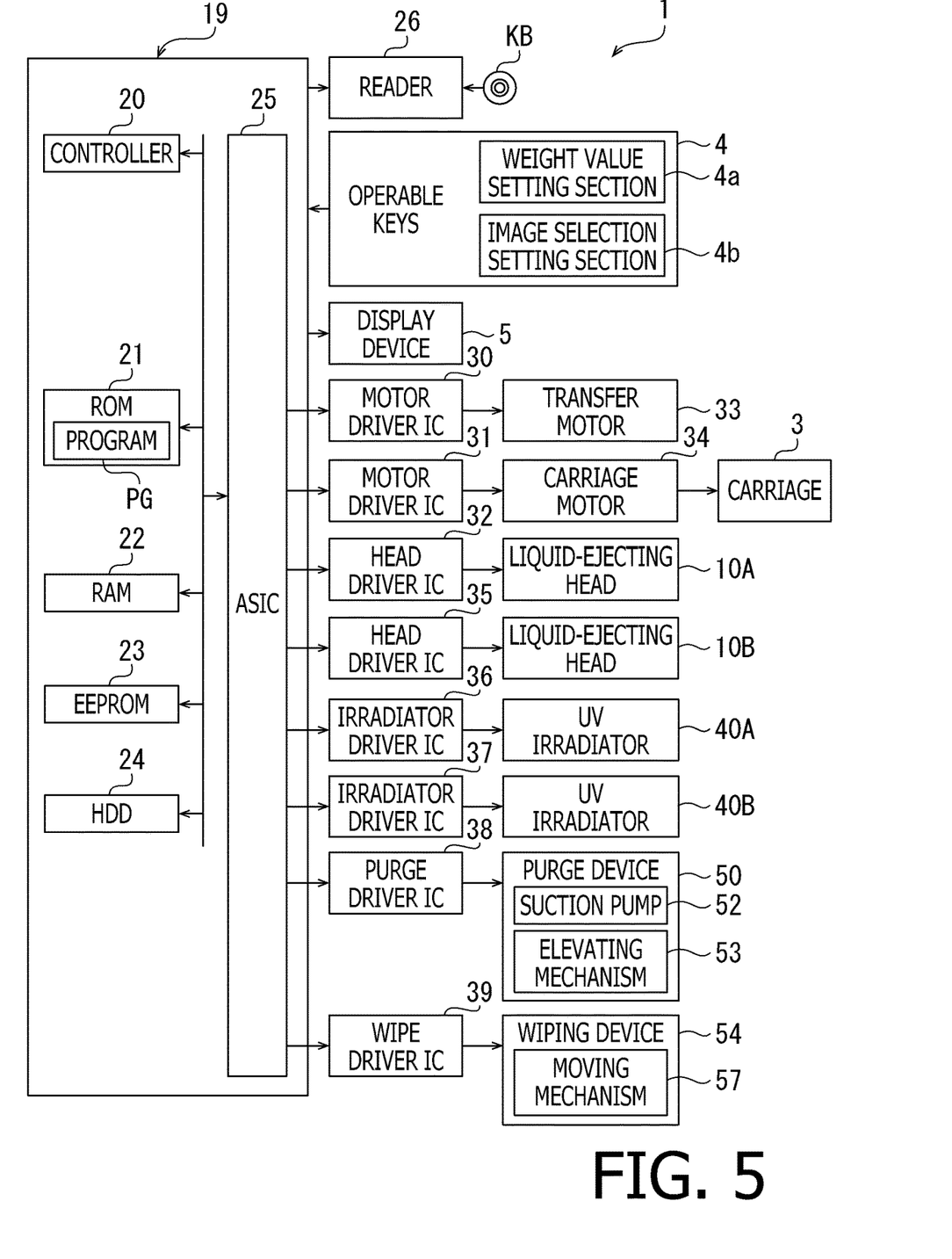
FIG. 5 is a block diagram showing an electrical configuration of the printer.

Next, each element included in the printer 1 in the illustrative embodiment will be described with reference to the block diagram shown in FIG. 5. As shown in FIG. 5, in addition to the aforementioned elements, the printer 1 further includes a reader 26, motor driver ICs 30 and 31, head driver ICs 32 and 35, the transfer motor 33, a carriage motor 34, irradiator driver ICs 36 and 37, a purge driver IC 38, and a wipe driver IC 39.

The aforementioned controller unit 19 includes a controller 20, storage devices (e.g., a ROM 21, a RAM 22, an EEPROM 23, and an HDD 24), and an ASIC 25. The controller 20 is connected with the above storage devices, and controls each driver IC 30-32 and the display device 5.

The controller 20 is configured to achieve various functions by executing particular processing program PG stored in the ROM 21. For instance, the controller 20 performs a halftone process and a rasterization process, as well as a color conversion process to convert print data in an RGB color space into print data in a CMYK color space. The controller 20 may be incorporated, in the controller unit 19, as a single processor in the controller unit 19 or as a plurality of processors to cooperate with each other. The processing program PG are read by the reader 26 from a recording medium KB such as a computer-readable magneto-optical disk or a USB flash memory, and are then stored in the ROM 21. The RAM 22 is configured to store externally received print data and results of calculations made by the controller 20. Examples of the print data may include, but are not limited to, data with RGB values each having 256 gradations. The EEPROM 23 stores various types of initial setting information input by the user. For instance, the HDD 24 stores particular information.

The ASIC 25 is connected with the motor driver ICs 30 and 31, the head driver ICs 32 and 35, the irradiator driver ICs 36 and 37, the purge driver IC 38, and the wipe driver IC 39. In response to acceptance of a print job, the controller 20 sends an image recording instruction to the ASIC 25 in accordance with the processing program PG. The ASIC 25 drives each of the driver ICs 30-32, and 35-39 based on the image recording instruction. The controller 20 drives, with the motor driver IC 30, the transfer motor 33 to move the platen 6 in the sub scanning direction Df. The controller 20 drives, with the motor driver IC 31, the carriage motor 34 to move the carriage 3 in the main scanning direction Ds. The controller 20 drives, with the head driver ICs 32 and 35, the liquid-ejecting heads 10A and 10B to eject ink. The controller 20 drives, with the irradiator driver ICs 36 and 37, the UV irradiators 40A and 40B to cause the LED chips of the UV irradiators 40A and 40B to emit UV light. The controller 20 drives, with the purge driver IC 38, the suction pump 52 and the elevating mechanism 53 of the purge device 50. The controller 20 drives, with the wipe driver IC 39, the moving mechanism 57 of the wiping device 54.

Subsequently, patch image printing by the printer 1 of the illustrative embodiment will be described. The colors printed by the liquid-ejecting heads 10 of the printer 1 may not necessarily be user-desired ones and therefore may need to be adjusted by the user. In this case, color calibration is performed through patch image printing and color measurement. In the illustrative embodiment, prior to an after-mentioned patch image printing process (see S6 in FIG. 9), the controller 20 first determines (selects) some (more exactly, at least one but not all) of a plurality of layers contained in original print data, based on weight information regarding a weight of each of the plurality of layers. Then, the controller 20 generates print data based on the selected some layers, and controls the liquid-ejecting heads 10 to print patch images based on the generated image data. The following provides a detailed explanation.

Figure 6A:
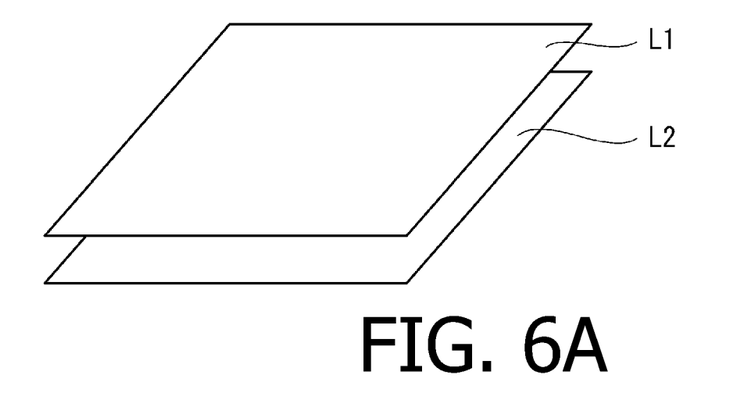
FIG. 6A illustrates an overcoat instruction layer and an image layer.
Figure 6B:
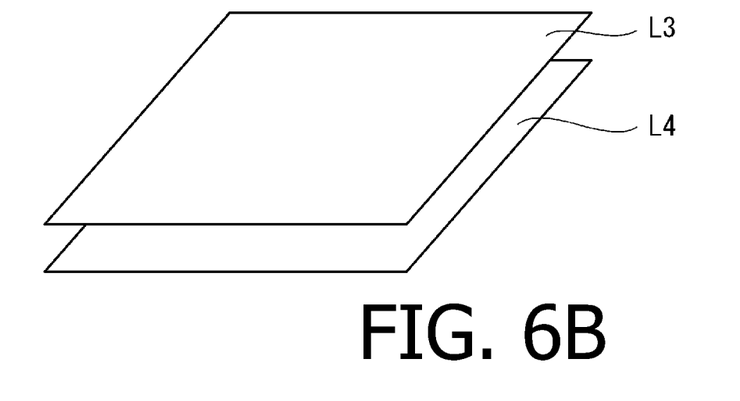
FIG. 6B illustrates a character layer and a background layer.
Figure 7A:
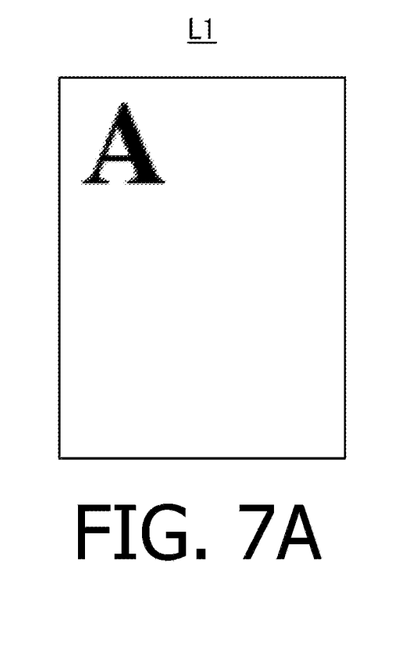
FIG. 7A shows a specific example of the overcoat instruction layer.
Figure 7B:
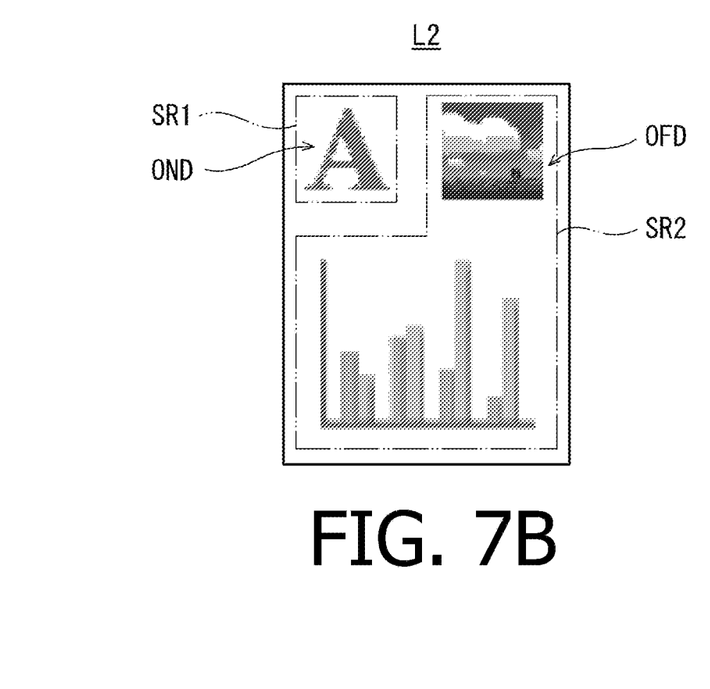
FIG. 7B shows a specific example of the image layer.

FIG. 6A illustrates an overcoat instruction layer L1 and an image layer L2. FIG. 6B illustrates a character layer L3 and a background layer L4. FIG. 7A shows a specific example of the overcoat instruction layer L1. FIG. 7B shows a specific example of the image layer L2. For instance, the original print data may include the overcoat instruction layer L1 and the image layer L2. Further, for instance, the original print data may include the character layer L3 and the background layer L4.

The image layer L2 in FIG. 6A is a layer representing an image. The image represented by the image layer L2 is a 256-gradation color image in the RGB color space. As shown in FIG. 7B, print data of the image represented by the image layer L2 includes on-pixel image data OND and off-pixel image data OFD. The on-pixel image data OND is image data that corresponds to a setting area SR1 in which an instruction to eject clear ink from the clear ink nozzles 121Cr is indicated in the overcoat instruction layer L1. Examples of the image represented by the on-pixel image data OND may include, but are not limited to, a company name and a company logo.

On the other hand, the off-pixel image data OFD is image data that has an after-mentioned weight value lower than the weight value of the on-pixel image data OND and corresponds to a setting area SR2 in which no instruction to eject clear ink from the clear ink nozzles 121Cr is indicated. Examples of the image represented by the off-pixel image data OFD may include, but are not limited to, a graph and a landscape photograph.

The overcoat instruction layer L1 in FIG. 6A represents a protective layer positioned above the image layer L2. For instance, the overcoat instruction layer L1 is as shown in FIG. 7A. The overcoat instruction layer L1 shown in FIG. 7A realizes a protective layer to protect the image (e.g., the character "A") represented by the on-pixel image data OND in FIG. 7B. The character layer L3 in FIG. 6B is a layer representing one or more characters, and may also be referred to as a "foreground layer." The background layer L4 in FIG. 6B is a layer representing a background other than the aforementioned one or more characters.

In the illustrative embodiment, weight information is previously set for each of the character layer L3, the background layer L4, the on-pixel image data OND of the image layer L2, and the off-pixel image data OFD of the image layer L2. The weight information is, for instance, a weight value that numerically indicates a weight. The weight value(s) will be described as follows.

Figure 8:
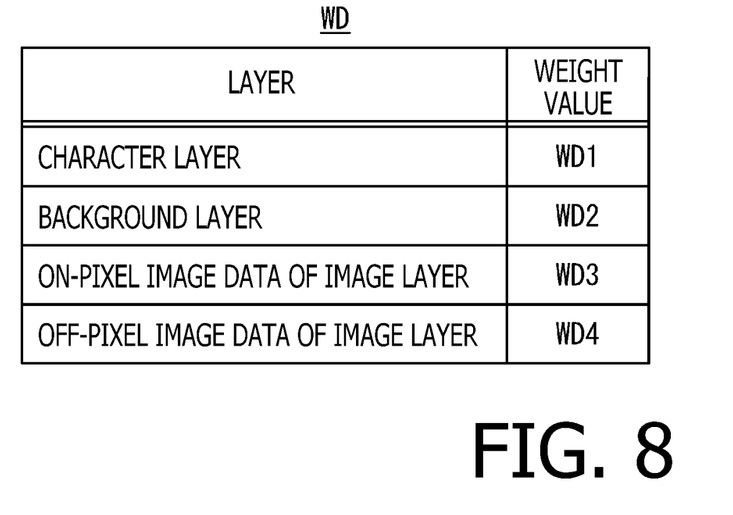
FIG. 8 is a weight map indicating a weight value of each layer.

FIG. 8 is a weight map WD that indicates the respective weight values of the character layer L3, the background layer L4, the on-pixel image data OND of the image layer L2, and the off-pixel image data OFD of the image layer L2. The weight map WD is previously stored in the ROM 21 or the HDD 24. As shown in FIG. 8, it is assumed that in the weight map WD, the weight value of the character layer L3 is WD1, and the weight value of the background layer L4 is WD2. In this case, the weight value WD1 of the character layer L3 is set higher than the weight value WD2 of the background layer L4. In addition, it is assumed that the weight value of the on-pixel image data OND in the image layer L2 is WD 3, and the weight value of the off-pixel image data OFD in the image layer L2 is WD4. In this case, the weight value WD 3 of the on-pixel image data OND in the image layer L2 is set higher than the weight value WD4 of the off-pixel image data OFD in the image layer L2.

Here, the operable keys 4 include a weight value setting section 4a and an image selection setting section 4b. The weight value setting section 4a is operated by the user to set the weight values. The image selection setting section 4b is operated by the user to set a weight value for a part of the print data represented by the image layer L2. The respective weight values for the character layer L3 and the background layer L4 may previously and arbitrarily be set by the user via the weight value setting section 4a provided in the operable keys 4. In addition, the respective weight values for the on-pixel image data OND and the off-pixel image data OFD in the image layer L2 may previously and arbitrarily be set by the user via the image selection setting section 4b provided in the operable keys 4. Using the weight value setting section 4a, contrary to what has been described above, the weight value WD2 of the background layer L4 may be set higher than the weight value WD1 of the character layer L3. Similarly, using the image selection setting section 4b, the weight value WD4 of the off-pixel image data OFD in the image layer L2 may be set higher than the weight value WD3 of the on-pixel image data OND in the image layer L2.

Subsequently, based on (the respective heights of) the weight values for the plurality of layers as described above, the controller 20 determines (selects) some (more exactly, at least one but not all) of the plurality of layers as layers in which patch images should be printed on the printing medium W. Specifically, for instance, when the original print data includes the character layer L3 and the background layer L4, the controller 20 does not generate print data based on the background layer L4 but generates print data based only on the character layer L3, and controls the liquid-ejecting heads 10 to print a patch image on the printing medium W based on the generated print data. Namely, the controller 20 generates the print data based only on the layer with a higher weight value and does not generate print data for the layer with a lower weight value. In this case, the controller 20 extracts one or more colors each having a color occupancy rate higher than a threshold from among colors in the character layer L3 that has been determined as the aforementioned "some layers in which patch images should be printed on the printing medium W." Then, the controller 20 generates the print data based on the extracted colors, and controls the liquid-ejecting heads 10 to print the patch image on the printing medium W.

Further, when the original print data includes the overcoat instruction layer L1 and the image layer L2, the controller 20 generates print data based on the on-pixel image data OND in the image layer L2, and controls the liquid-ejecting heads 10 to print a patch image on the printing medium W based on the generated print data. In this case, the controller 20 extracts one or more colors each having a color occupancy rate higher than a threshold from among colors in the on-pixel image data OND, then generates the print data based on the extracted colors, and controls the liquid-ejecting heads 10 to print the patch image on the printing medium W.

Figure 9:
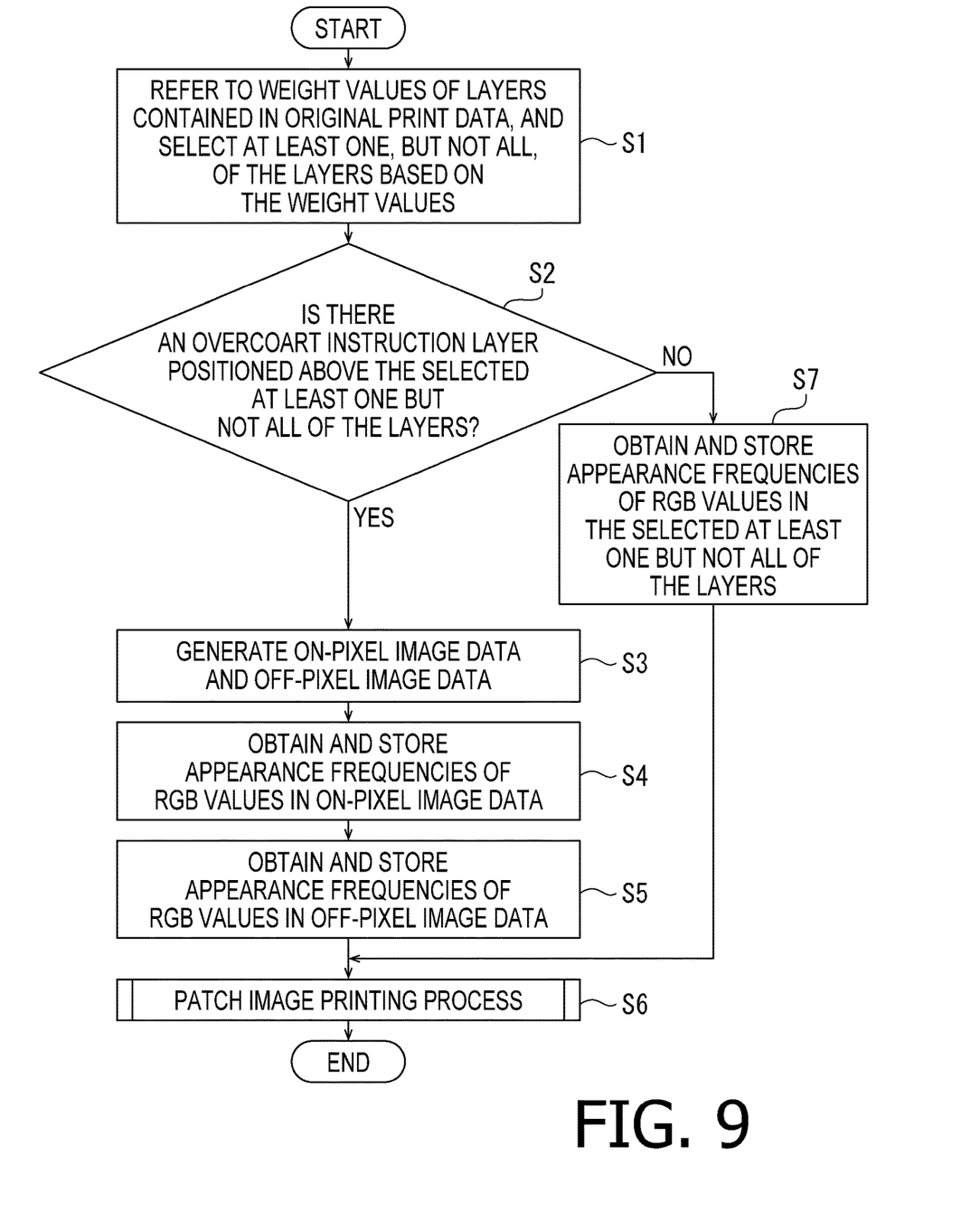
FIG. 9 is a flowchart showing a main routine for patch image printing by the printer.
Figure 10:
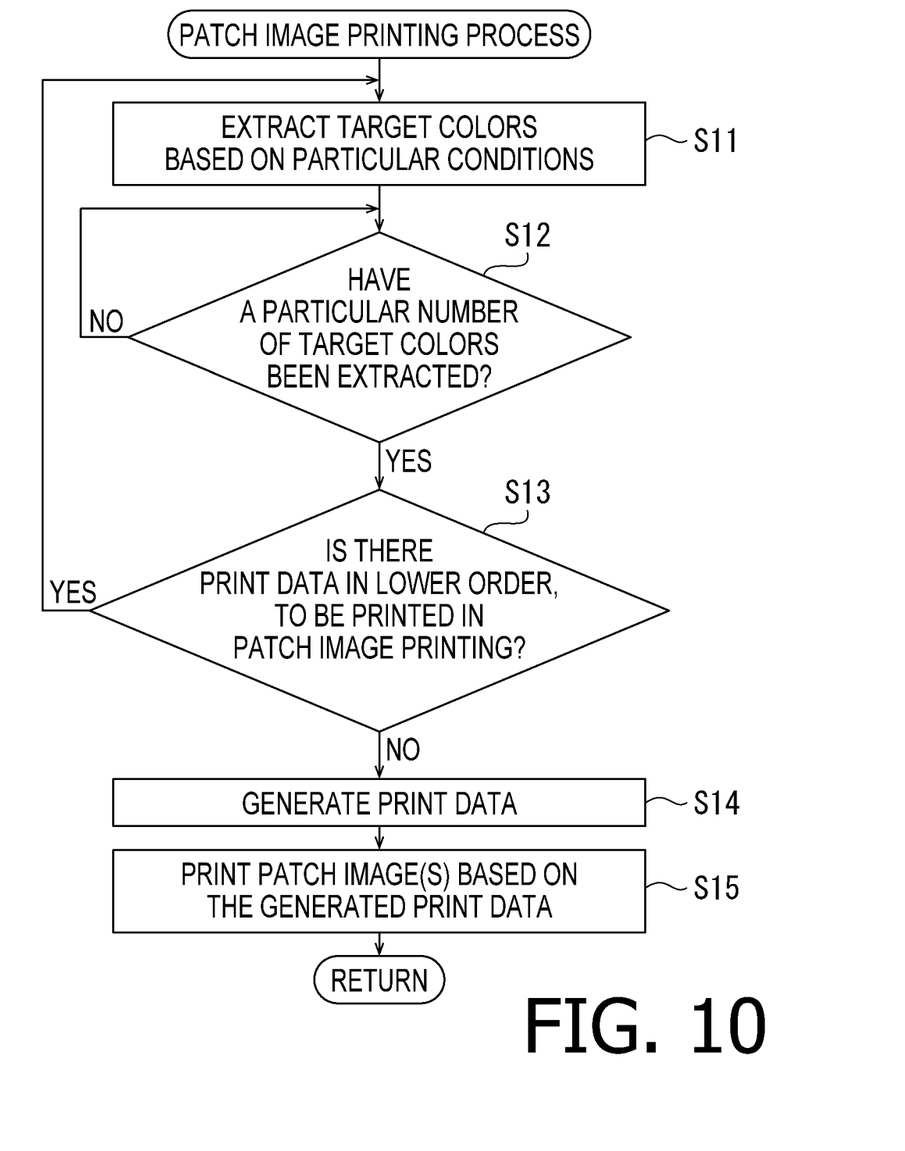
FIG. 10 is a flowchart showing a subroutine for a patch image printing process in the main routine shown in FIG. 9.

FIG. 9 is a flowchart showing a main routine for the patch image printing, by the printer 1 of the illustrative embodiment. FIG. 10 is a flowchart showing a subroutine of a patch image printing process (see S6) shown in FIG. 9. The processes shown in FIGS. 9 and 10 may be performed by the controller 20 executing the processing program PG stored in the ROM 21.

As shown in FIG. 9, with respect to the plurality of layers contained in the original print data, the controller 20 refers to their respective weight values stored in the ROM 21 or the HDD 24, and determines (selects) some (more exactly, at least one but not all) of the plurality of layers based on the weight values (S1).

Next, the controller 20 determines whether there is an overcoat instruction layer L1 positioned above the above selected some layers (S2). When determining that there is an overcoat instruction layer L1 positioned above the selected some layers (S2: Yes), the controller 20 generates the on-pixel image data OND and the off-pixel image data OFD (S3). Here, the on-pixel image data OND is data in which, in FIG. 7B, the setting area SR2 is entirely set white, and only the image in the setting area SR1 is left. Meanwhile, the off-pixel image data OFD is data in which, in FIG. 7B, the setting area SR1 is entirely set white, and only the image in the setting area SR2 is left.

Next, the controller 20 obtains, with respect to each pixel, respective appearance frequencies of the RGB values in the on-pixel image data OND, and stores the obtained appearance frequencies into the RAM 22 or the HDD 24 (S4). Then, the controller 20 obtains, with respect to each pixel, respective appearance frequencies of the RGB values in the off-pixel image data OFD, and stores the obtained appearance frequencies into the RAM 22 or the HDD 24 (S5). Afterward, the controller 20 performs a patch image printing process (S6).

On the other hand, when determining that there is not an overcoat instruction layer L1 positioned above the selected some layers (S2: No), the controller 20 obtains, with respect to each pixel, respective appearance frequencies of the RGB values in the selected some layers, and stores the obtained appearance frequencies into the RAM 22 or the HDD 24 (S7). Afterward, the controller 20 performs the patch image printing process (S6).

The patch image printing process is described below. As shown in FIG. 10, the controller 20 extracts target colors based on particular conditions (S11). In this case, when there is an overcoat instruction layer L1, the controller 20 may extract, from among colors in the on-pixel image data OND, one or more colors each having a color occupancy rate higher than the threshold (i.e., one or more colors each having a relatively large occupied area) according to the particular conditions. In addition, when there is not an overcoat instruction layer L1, the controller 20 may extract, from among colors in the selected some layers (e.g., the character layer L3), one or more colors each having a color occupancy rate higher than the threshold (i.e., one or more colors each having a relatively large occupied area) according to the particular conditions.

Next, the controller 20 determines whether a particular number of target colors (e.g., target colors of 100 patches) have been extracted (S12). When determining that a particular number of target colors have been extracted (S12: Yes), the controller 20 determines whether there is print data, in a lower order, to be printed in the patch image printing (S13). It is desirable that the particular number of the target colors to be extracted is at most 100, to suppress color distortion when print data in the RGB color space is converted into print data in the CMYK color space.

When determining that there is print data, in a lower order, to be printed in the patch image printing (i.e., when the original print data contains three or more layers, and print data in a lower order is target data to be printed in the patch image printing) (S13: Yes), the controller 20 goes back to S11.

Meanwhile, when determining that there is not print data, in a lower order, to be printed in the patch image printing (i.e., when the original print data contains only two layers, or print data in a lower order is not target data to be printed in the patch image printing even though the original print data contains three or more layers) (S13: No), the controller 20 proceeds to S14.

In S14, the controller 20 generates print data based on the selected some layers. Then, the controller 20 controls the liquid-ejecting heads 10 to print the patch images based on the generated print data (S15).

As described above, according to the printer 1 of the illustrative embodiment, patch images are printed on the printing medium W based on the selected some layers (more exactly, the selected at least one but not all of the plurality of layers), instead of printing on the printing medium W the patch images of all the layers as performed heretofore. Therefore, it is possible to reduce a memory capacity of the printer 1 and selectively print patch image(s). This enables selective printing, for instance, when the user wishes to print patch image(s) by determining preferential colors.

Further, in the illustrative embodiment, the controller 20 of the printer 1 extracts one or more colors each having a color occupancy rate higher than a threshold from among the colors in the character layer L3 that is an example of "the selected some layers" and then causes the liquid-ejecting heads 10 to print the patch image based on the extracted colors. Thereby, it is possible to obtain the patch image based on the colors with relatively large occupied areas in the character layer L3.

Further, in the illustrative embodiment, when the original print data contains the character layer L3 and the background layer L4, the controller 20 causes the liquid-ejecting heads 10 to print the patch image on the printing medium W based on the character layer L3. Thereby, it is possible to selectively print, on the printing medium W, the patch image which is a character image to draw a higher degree of visual attention than the background image in most situations.

Further, in the illustrative embodiment, when the original print data contains the overcoat instruction layer L1 and the image layer L2, the controller 20 causes the liquid-ejecting heads 10 to print the patch image on the printing medium W based on the on-pixel image data OND in the image layer L2. Thereby, it is possible to selectively print, on the printing medium W, the patch image which is an image of the on-pixel image data OND to draw a higher degree of visual attention than the off-pixel image data OFD in most situations.

Further, in the illustrative embodiment, the controller 20 extracts one or more colors each having a color occupancy rate higher than a threshold from among the colors in the on-pixel image data OND, and causes the liquid-ejecting heads 10 to print the patch image on the printing medium W based on the extracted colors. Thereby, it is possible to obtain the patch image based on the colors with the relatively large occupied areas in the on-pixel image data OND.

In the illustrative embodiment, the respective weight values for the character layer L3 and the background layer L4 may be set via the weight value setting section 4a included in the operable keys 4. Thereby, it is possible to arbitrarily set desired weight values for the character layer L3 and the background layer L4 based on the visual attention degrees of the character layer L3 and the background layer L4.

Further, in the illustrative embodiment, the respective weight values for the on-pixel image data OND and the off-pixel image data OFD in the image layer L2 may be set via the image selection setting section 4b included in the operable keys 4. Thereby, it is possible to arbitrarily set desired weight values for the on-pixel image data OND and the off-pixel image data OFD based on the visual attention degrees of the on-pixel image data OND and the off-pixel image data OFD.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of its versatility are shown and described in the present disclosure. It is to be understood that aspects of the present disclosure are capable of use in various other combinations and environments and are capable of changes or modifications within the scope of the inventive concept as expressed herein. For instance, the following modifications are feasible.

In the aforementioned illustrative embodiment, the controller 20 generates print data based on one layer (i.e., at least one but not all) of the two layers, which is a part of the two layers, and causes the liquid-ejecting heads 10 to print the patch image based on the generated print data. However, aspects of the present disclosure are not limited to this. For instance, the controller 20 may generate print data based on one or two layers (i.e., at least one but not all) of three layers, and may cause the liquid-ejecting heads 10 to print patch image(s) based on the generated print data. Namely, according to aspects of the present disclosure, the controller 20 causes the liquid-ejecting heads 10 to print one or more patch images based on at least one but not all of a plurality of layers.

Further, in the aforementioned illustrative embodiment, the controller 20 extracts one or more colors each having a color occupancy rate higher than a threshold (i.e., one or more colors each having a relatively large occupied area) from among the colors in the selected some layers (more exactly, the selected at least one but not all, of the plurality of layers) (e.g., in the character layer L3). In addition, the controller 20 extracts one or more colors each having a color occupancy rate higher than a threshold (i.e., one or more colors each having a relatively large occupied area) from among the colors in the on-pixel image data OND. For instance, however, the printer 1 may be configured to previously specify (or previously accept designation of) one or more user-desired colors.

Further, in the aforementioned illustrative embodiment, the serial-type liquid-ejecting heads 10 are employed. However, a line-type liquid-ejecting head may be employed.

Further, in the aforementioned illustrative embodiment, a piezoelectric element is employed as the actuator 160. However, other actuators, such as a heater for ejecting ink droplets in a film boiling method, may be employed.

The following shows examples of associations between elements exemplified in the aforementioned illustrative embodiment and modifications and elements according to aspects of the present disclosure. For instance, the printer 1 may be an example of a "printer" according to aspects of the present disclosure. The liquid-ejecting heads 10 may be included in examples of a "print head" according to aspects of the present disclosure. The controller 20 may be included in examples of a "controller" according to aspects of the present disclosure. Further, the controller unit 19, which includes the controller 20 and the ROM 21 storing the processing program PG, may be included in examples of the "controller" according to aspects of the present disclosure. The original print data containing the plurality of layers may be an example of "first print data" according to aspects of the present disclosure. The original print data containing the plurality of layers may be an example of "first print data" according to aspects of the present disclosure. The print data generated based on the selected some (more exactly, at least one but not all) of the plurality of layers may be an example of "second print data" according to aspects of the present disclosure. The weight value setting section 4a and the image selection setting section 4b may be included in examples of a "user-operable member" according to aspects of the present disclosure. The recording medium KB and the ROM 21 may be included in examples of a "non-transitory computer-readable medium" according to aspects of the present disclosure.

What is claimed is:

1. A printer comprising:
a print head; and
a controller configured to:
   using first print data containing a plurality of layers, select at least one, but not all, of the plurality of layers based on weight information regarding respective weights of the plurality of layers;
   generate second print data based on the selected at least one but not all of the plurality of layers; and
   control the print head to print at least one patch image on a printing medium based on the generated second print data.

2. The printer according to claim 1,
wherein the controller is further configured to:
   extract one or more colors each having a color occupancy rate higher than a threshold, from among colors in the selected at least one but not all of the plurality of layers; and
   generate the second print data based on the extracted one or more colors, and control the print head to print the at least one patch image based on the generated second print data.

3. The printer according to claim 1,
wherein the plurality of layers include:
   a character layer as a foreground layer representing one or more characters; and
   a background layer representing a background other than the one or more characters,
wherein the weight information represents a weight value numerically indicating the weight of each layer, the character layer having a weight value higher than a weight value of the background layer, and wherein the controller is further configured to:
  select the character layer as the at least one but not all of the plurality of layers, based on the weight values of the character layer and the background layer; and
  generate the second print data based on the selected character layer, and control the print head to print the at least one patch image based on the generated second print data.

4. The printer according to claim 1,
wherein the print head has a clear ink nozzle configured to eject clear ink onto the printing medium,
wherein the plurality of layers include:
  an image layer representing an image; and
  an overcoat instruction layer representing a protective layer positioned above the image layer,
wherein the weight information represents a weight value numerically indicating the weight of each layer,
wherein print data of the image represented by the image layer contains:
  on-pixel image data corresponding to a setting area in which an instruction to eject clear ink from the clear ink nozzle is indicated in the overcoat instruction layer; and
  off-pixel image data corresponding to a setting area in which no instruction to eject clear ink from the clear ink nozzle is indicated in the overcoat instruction layer, the off-pixel image data having a weight value lower than a weight value of the on-pixel image data, and
wherein the controller is further configured to generate the second print data based on the on-pixel image data, and control the print head to print the at least one patch image based on the generated second print data.

5. The printer according to claim 4,
wherein the controller is further configured to:
  extract one or more colors each having a color occupancy rate higher than a threshold, from among colors in the on-pixel image data; and
  generate the second image data based on the extracted one or more colors, and control the print head to print the at least one patch image based on the generated second print data.

6. The printer according to claim 4, further comprising a user-operable member configured to be operated by a user to set a weight value for a part of the print data represented by the image layer.

7. The printer according to claim 1,
wherein the weight information represents a weight value numerically indicating the weight of each layer, and
wherein the printer further comprises a user-operable member configured to be operated by a user to set the weight value for each layer.

8. A non-transitory computer-readable medium storing computer-readable instructions executable by a controller of a printer comprising a print head, the instructions being configured to, when executed by the controller, cause the controller to:
  using first print data containing a plurality of layers, select at least one, but not all, of the plurality of layers based on weight information regarding respective weights of the plurality of layers;
  generate second print data based on the selected at least one but not all of the plurality of layers; and
  control the print head to print at least one patch image on a printing medium based on the generated second print data.

9. A method implementable on a controller of a printer comprising a print head, the method comprising:
  by using first print data containing a plurality of layers, selecting at least one, but not all, of the plurality of layers based on weight information regarding respective weights of the plurality of layers;
  generating second print data based on the selected at least one but not all of the plurality of layers; and
  controlling the print head to print at least one patch image on a printing medium based on the generated second print data.

* * * * *